(12) United States Patent
Schaffer et al.

(10) Patent No.: US 11,152,799 B2
(45) Date of Patent: Oct. 19, 2021

(54) METHODS AND APPARATUS TO CHARGE ELECTRIC VEHICLES

(71) Applicant: Ford Global Technologies, LLC, Dearborn, MI (US)

(72) Inventors: Daniel Mark Schaffer, Livonia, MI (US); Kenneth James Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 304 days.

(21) Appl. No.: 16/303,397

(22) PCT Filed: May 25, 2016

(86) PCT No.: PCT/US2016/034095
§ 371 (c)(1),
(2) Date: Nov. 20, 2018

(87) PCT Pub. No.: WO2017/204797
PCT Pub. Date: Nov. 30, 2017

(65) Prior Publication Data
US 2020/0317084 A1    Oct. 8, 2020

(51) Int. Cl.
| | |
|---|---|
| *B60L 58/12* | (2019.01) |
| *B60L 53/64* | (2019.01) |
| *B60L 53/30* | (2019.01) |
| *H02J 7/00* | (2006.01) |
| *B60L 50/60* | (2019.01) |

(52) U.S. Cl.
CPC ............ *H02J 7/0027* (2013.01); *B60L 50/60* (2019.02); *B60L 53/305* (2019.02); *B60L 53/64* (2019.02); *B60L 58/12* (2019.02)

(58) Field of Classification Search
CPC ........ B60L 58/12; B60L 53/305; B60L 53/64; B60L 53/30; B60L 50/60; H02J 7/0027
USPC ......................................................... 320/109
See application file for complete search history.

(56) References Cited

U.S. PATENT DOCUMENTS

| | | | | |
|---|---|---|---|---|
| 5,892,346 | A * | 4/1999 | Moroto | B60W 10/26 318/587 |
| 2005/0228553 | A1 * | 10/2005 | Tryon | G01C 21/3617 701/22 |
| 2009/0195219 | A1 * | 8/2009 | Morita | H02J 7/0077 320/162 |

(Continued)

*Primary Examiner* — Richard Isla
*Assistant Examiner* — Dung V Bui
(74) *Attorney, Agent, or Firm* — Brandon Hicks; Eversheds Sutherland (US) LLP

(57) ABSTRACT

Methods and apparatus to charge electric vehicles are disclosed. An example method includes monitoring, via a processor, a battery charge level of an electric vehicle receiving a battery charge from a mobile charging unit. The example method includes determining, via the processor, a remaining trip distance of the electric vehicle from a location of the battery charge to a trip destination. The example method further includes determining, via the processor, a target charge level for the battery charge. The target charge level corresponds to when the battery charge level provides a first probability that the electric vehicle will reach the trip destination without an additional battery charge. The example method also includes generating, via the processor, a signal to stop the battery charge when the battery charge level reaches the target charge level.

20 Claims, 8 Drawing Sheets

(56) References Cited

U.S. PATENT DOCUMENTS

| | | | |
|---|---|---|---|
| 2010/0138093 A1* | 6/2010 | Oku | B60W 10/26 701/22 |
| 2012/0173134 A1* | 7/2012 | Gutman | G01C 21/3476 701/400 |
| 2012/0271758 A1* | 10/2012 | Jammer | B60L 53/57 705/39 |
| 2012/0303397 A1* | 11/2012 | Prosser | H02J 7/342 705/7.12 |

* cited by examiner

METHODS AND APPARATUS TO CHARGE ELECTRIC VEHICLES

FIELD OF THE DISCLOSURE

This disclosure relates generally to electric vehicles and, more particularly, to methods and apparatus to charge electric vehicles.

BACKGROUND

A significant cost in the manufacturing of electric vehicles (EVs), including fully electric vehicles and hybrid electric vehicles, is the battery assembly. Typically, EV battery assemblies include one or more large batteries to ensure adequate driving range so that an EV user can confidently travel to desired destinations and return to a charging station (e.g., at the user's home or workplace) where the EV batteries can be recharged. Such large battery assemblies are not only expensive but add significant weight to EVs, resulting in an increase to the size, weight, and cost of the supporting vehicle chassis. Furthermore, the additional weight of the battery assembly and supporting chassis can negatively impact the efficiency or fuel economy of the vehicle.

SUMMARY

Methods and apparatus to charge electric vehicles are disclosed. An example method includes monitoring, via a processor, a battery charge level of an electric vehicle receiving a battery charge from a mobile charging unit. The example method includes determining, via the processor, a remaining trip distance of the electric vehicle from a location of the battery charge to a trip destination. The example method further includes determining, via the processor, a target charge level for the battery charge. The target charge level corresponds to when the battery charge level provides a first probability that the electric vehicle will reach the trip destination without an additional battery charge. The example method also includes generating, via the processor, a signal to stop the battery charge when the battery charge level reaches the target charge level.

An example apparatus includes a battery charge level monitor to monitor a battery charge level of an electric vehicle receiving a battery charge from a mobile charging unit. The example apparatus further includes a trip route analyzer to determine a remaining trip distance of the electric vehicle from a location of the battery charge to a trip destination. The example apparatus also includes a charge monitoring system to determine a target charge level for the battery charge. The target charge level corresponds to when the battery charge level provides a first probability that the electric vehicle will reach the trip destination without an additional battery charge. The charge monitoring system is to generate a signal to stop the battery charge when the battery charge level reaches the target charge level. At least one of the battery charge level monitor, the trip route analyzer, or the charge monitoring system is to be implemented via a processor.

An example tangible computer readable storage medium includes instructions that, when executed, cause a machine to at least monitor a battery charge level of an electric vehicle receiving a battery charge from a mobile charging unit. The instructions further cause the machine to determine a remaining trip distance of the electric vehicle from a location of the battery charge to a trip destination. The instructions also cause the machine to determine a target charge level for the battery charge. The target charge level corresponding to when the battery charge level provides a first probability that the electric vehicle will reach the trip destination without an additional battery charge. The instructions further cause the machine to generate a signal to stop the battery charge when the battery charge level reaches the target charge level.

BRIEF DESCRIPTION OF THE DRAWINGS

The figures are not necessarily to scale. Wherever possible, the same reference numbers will be used throughout the drawing(s) and accompanying written description to refer to the same or like parts.

DETAILED DESCRIPTION

Figure 1:
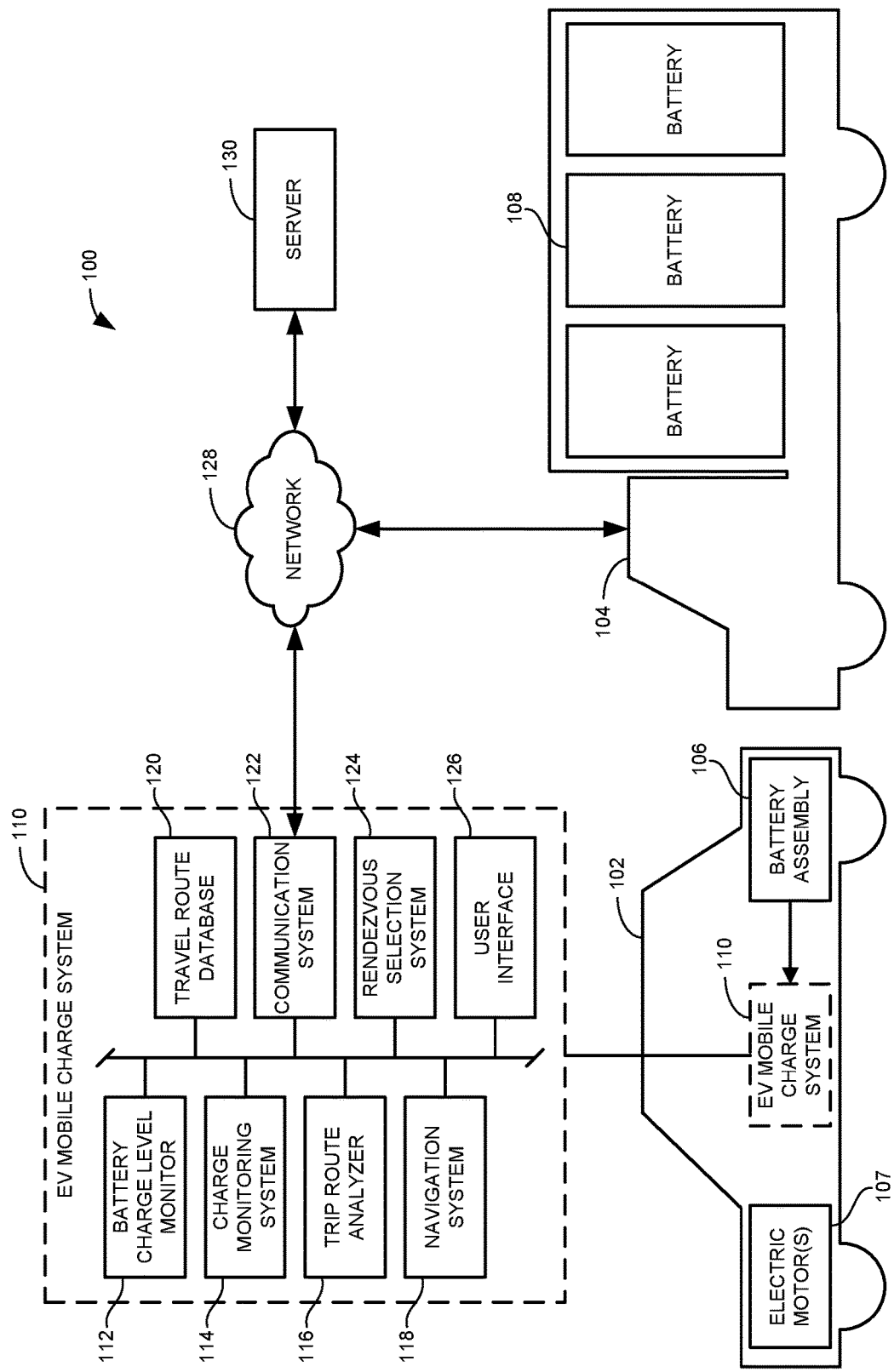
FIG. 1 illustrates an example system within which the teachings disclosed herein may be implemented to charge an EV.

An electric vehicle (EV) may be a full EV, which operates entirely on electricity, or a hybrid EV, which includes two powertrains: one powered by a battery and one powered by gas or some other fuel. This could include a hybrid fuel cell vehicle where the electric motor is powered by either a fuel cell or a battery. Both full EVs and hybrid EVs include a battery assembly to store energy. Although EVs are becoming more prevalent, many consumers are reluctant to purchase such a vehicle because EVs can be relatively expensive. The costs associated with batteries used in EVs can be a significant contributing factor to the high costs of EVs. Some consumers desire an EV driving range of approximately 300-400 miles without a battery charge, but meeting this consumer desire may result in battery costs of as much as 40,000. Even where consumers do not anticipate travelling long distances, they may still desire an EV with a battery capacity two to three times their typical travel distance between charges to ensure they will not deplete the electrical energy stored in the batteries if they end up
} needing to travel farther than expected. For example, a consumer that usually travels up to 50 miles each day will typically desire a vehicle having a driving range of at least 100-150 miles. As a result, EVs are typically manufactured with relatively large battery assemblies to meet the consumers' demands Not only are these large battery assemblies expensive, but they add significant weight to the vehicle and, thus, decrease the efficiency of the vehicle. Furthermore, the added weight of large battery assemblies results in the need for a larger and/or heavier chassis to support the battery assembly, which further adds costs to the manufacturing of the vehicle and reduces the fuel economy of the vehicle.

Example methods and apparatus are disclosed herein that enable use of smaller battery assemblies in EVs, thereby resulting in less expensive, more efficient vehicles while enabling consumers to travel to their desired destinations without being stranded in a location without battery power. In some examples disclosed herein, one or more mobile charging units (e.g., a vehicle equipped to provide an electric charge to the batteries of an EV) are stationed throughout a city and/or across a network of multiple cities. An EV may request to meet or rendezvous with one of the mobile charging units (MCUs) at a location along or close to the travel route of the EV to receive a charge to its batteries. More particularly, in some examples, the request and arrangement of a meeting or rendezvous location for a battery charge may be based on when a remaining level of energy stored in the batteries of the EV is such that the EV is unlikely to reach a trip destination corresponding to a stationary charging unit (e.g., a wall electrical socket at the EV user's home) before depleting the energy stored in the batteries.

The ability to arrange for a battery charge at virtually any location where an EV can rendezvous with a MCU, reduces or eliminates the need for excess battery capacity as a built in safety factor for the driving range of the EV. That is, assuming that most consumers travel no more than 50 miles in a day, an EV would only need to have sufficient battery power to travel 50 miles because consumers would know that if they occasionally need to travel further, they would be able to obtain a charge from a MCU near the time and near the location where they would otherwise deplete the stored energy in their batteries to a point where a charge is necessary to continue their travel. The reduced battery capacity requirements substantially reduce the cost of manufacturing an EV. Furthermore, the reduced weight of the EV resulting from a smaller battery assembly improves the fuel economy of the vehicle.

In the less common circumstances where an EV user intends to travel a distance greater than the maximum driving range of the vehicle (e.g., greater than 50 miles), one or more rendezvous locations with multiple MCUs at different points along the expected travel route of the EV can be arranged. Longer travel routes, particularly intercity trips, may include longer road segments where few or no MCUs are immediately available. Accordingly, in some examples, some or all of the rendezvous locations are arranged well before the battery charge is actually needed to ensure the EV has sufficient driving range to travel across the longer road segments where there is limited or no access to MCUs. Furthermore, if an MCU is needed along a longer road segment (e.g., an EV does not have a sufficient driving range), arranging a battery charge rendezvous well before it is needed allows for sufficient time for a MCU to arrive at the location where the EV will need to be charged.

Charging an EV battery via a MCU may be more expensive than charging the battery at a stationary charging unit (e.g., at the EV user's home) such that the EV user may desire to receive no more energy during the mobile charge than is needed to travel to the stationary charging unit. Accordingly, in some disclosed examples, the charge or energy level of the battery is monitored during the battery charging process with the MCU and a signal is generated to stop the process when a sufficient battery energy level has been acquired.

Turning in detail to the drawings, FIG. 1 illustrates an example system 100 for charging an electric vehicle (EV) 102 with a mobile charging unit (MCU) 104. The EV 102 may be any vehicle powered at least in part by a battery or other stored electrical energy source. The EV 102 may be a full EV (e.g., powered entirely by electricity) or a hybrid EV (e.g., powered in part by stored electricity and in part by a gas or other fuel). In the illustrated example, the EV 102 includes a battery assembly 106. The battery assembly 106 may be one battery or multiple batteries that provide electrical power to an electric motor or motors 107 of the EV 102.

The MCU 104 may be any vehicle that has the capability to provide an electric charge to the battery assembly 106 of the EV 102. More particularly, in some examples, the MCU 104 can provide a direct current (DC) fast-charge that is capable of providing a sufficient charge to the battery assembly 106 in a relatively short period of time (e.g., a 50% charge in less than 15 minutes). In the illustrated example, the MCU 104 is a large vehicle (e.g., a commercial truck) that includes one or more batteries 108. In some examples, the batteries 108 of the MCU 104 are pre-charged. In other examples, the MCU 104 may charge the batteries 108 via a generator powered by the engine of the MCU 104 (e.g., the MCU 104 is a hybrid electric vehicle) and/or another engine carried by the MCU 104. In other examples, the MCU 104 may provide electrical energy to charge the battery assembly 106 of the EV 102 directly from a generator powered by the engine of the MCU 104. In some examples, the MCU 104 is one of a fleet of MCUs associated with a commercial entity in the business of providing battery charges to Evs. Additionally or alternatively, the MCU 104 may be one of a fleet of MCUs provided by a municipality or other governmental entity as a community service, such as a fleet in a large city. In other examples, the MCU 104 may be another EV that is privately owned by an individual that has agreed to share electrical energy with one or more other EVs such as the EV 102. In the illustrated example, the EV 102 and the MCU 104 include suitable electrical connectors along with other components necessary to enable the transfer of electrical energy from the MCU 104 to the EV 102 (i.e., to enable the MCU 104 to charge the EV 102).

In the illustrated example, the EV 102 includes an EV mobile charge system 110 to implement the teachings disclosed herein. As shown in the illustrated example, the EV mobile charge system 110 of the EV 102 includes an example battery charge level monitor 112, an example charge monitoring system 114, an example trip route analyzer 116, an example navigation system 118, an example travel route database 120, an example communication system 122, an example rendezvous selection system 124, and an example user interface 126.

In the illustrated example of FIG. 1, the battery charge level monitor 112 monitors the level of energy/charge remaining in the battery assembly 106. Based on the detected battery charge level, the charge monitoring system 114 may determine a remaining expected range of the EV 102 without a battery charge (i.e., the driving range before the battery assembly 106 is expected to be depleted of electrical energy to a point that the battery assembly 106 can no longer supply sufficient power to the electric motor(s) 107 to propel the EV 102). The remaining expected range of the EV 102 for a given battery charge level may vary depending on the circumstances of the EV's use. For example, the remaining expected range of the EV 102 may be smaller where the EV 102 is repeatedly stopping and starting in heavy traffic relative to when the EV 102 is travelling on a highway. Furthermore, more battery energy may be expended when travelling uphill than on a level road or going downhill. Further still, the use of an air conditioner, heater, fan blower, radio, and/or other components in the EV 102 consumes energy from the battery assembly 106, thereby affecting the remaining expected range of the EV 102. Accordingly, in some examples, the charge monitoring system 114 may consider these additional factors affecting battery energy consumption when calculating the remaining expected range of the EV 102.

The example EV mobile charge system 110 of FIG. 1 is provided with the trip route analyzer 116 to determine an expected route of the EV 102 to a designated trip destination. In some examples, the trip route analyzer 116 obtains the expected route from the navigation system 118 (or other onboard or mobile device) into which a user of the EV 102 has entered the trip destination. Where the user has not specifically entered the trip destination, the trip route analyzer 116 may determine the expected route of the EV 102 based on whether the current travel path of the EV 102 is recognizable as matching a historical or previously used travel path or route. That is, in some examples, the trip route analyzer 116 monitors the travel route of the EV 102 (e.g., using the navigation system 118) and stores common and/or repeated routes in the travel route database 120. For example, EV users may follow the same travel route to their workplace each morning and follow the same or similar route in reverse each evening to travel home. In such examples, even where users have not specified their trip destination, the trip route analyzer 116 may identify that the users are traveling to work or traveling home based on the current travel route of the vehicle and the time of day. Similarly, the trip route analyzer 116 may recognize other travel routes of the EV 102 (e.g., to the grocery store, to the doctor, etc.). In situations where the trip destination cannot be determined and/or there is an unanticipated deviation from an expected route, the trip route analyzer 116 may prompt the EV user to specify the trip destination.

Based on the expected route of the EV 102, the charge monitoring system 114 may determine a remaining distance of the EV 102 to the trip destination. In accordance with the teachings disclosed herein, determining the remaining trip distance of the EV 102 enables a determination of whether the EV 102 will need a charge before reaching the destination. However, if a particular location does not include the ability to charge the EV 102 and the EV 102 will not have sufficient energy stored in its battery assembly 106 to leave the location to reach a different location where battery charging is available, it is not helpful to know whether the EV 102 will be able to reach the first location at which charging is unavailable before needing a charge. Accordingly, in some examples, the trip destination is assumed to correspond to a location including a stationary charging unit for the EV 102 (e.g., the EV user's home where a battery charging system is fixedly located). Thus, in some examples, the expected route of the EV 102 may correspond to a round trip (e.g., to work and back home, to the store and back home, etc.) with the trip destination being the final destination, where extended charging may occur, rather than any intermediate stops.

Additionally or alternatively, in some examples, the remaining trip distance of the EV 102 is determined based on a distance from the current location of the EV 102 to any of one or more known trip destinations with a stationary charging unit regardless of the current travel path or route of the EV 102. For example, the known destinations may correspond to the EV user's work address, home address, electric vehicle servicing stations, etc. In some examples, the user may specify which locations are to be used as trip destinations in determining the remaining trip distance of the EV 102.

In the illustrated example, the charge monitoring system 114 compares the remaining trip distance of the EV 102 (based on the expected route) with the remaining expected range of the EV 102 (based on the battery charge level) to determine whether the EV 102 may need a charge before reaching its trip destination (e.g., a location having a stationary charging unit). If so, the charge monitoring system 114 may initiate procedures to request a rendezvous with the MCU 104 to receive a battery charge.

In some examples, a request for a battery charge rendezvous may be triggered when the ratio of the remaining trip distance of the EV 102 to the remaining expected range of the EV 102 exceeds a threshold. In some examples, the threshold to trigger a request for a mobile battery charge from the MCU 104 is 1 (i.e., threshold to be exceeded corresponds to when the remaining trip distance of the EV 102 is equal to the remaining expected range of the EV 102). In some examples, the threshold that the ratio of trip distance to remaining expected range is to exceed before triggering a response by the EV mobile charge system 110 may be slightly less than 1 (e.g., 0.85. 0.9, 0.95, etc.). The less than 1 value of the threshold serves to build in a factor of safety to account for variability in the remaining expected range of the EV 102 based on parameters that may affect battery charge consumption (e.g., a lot of stopping and starting versus travelling at highway speeds, changes in elevation (going uphill versus downhill), using an air conditioner, etc.) and/or unanticipated detours from the expected route of the EV 102. For example, a remaining trip distance of 19 miles with a remaining expected range of 20 miles results in a ratio of less than 1 (19/20=0.95) indicating the EV 102 should be able to reach the trip destination. However, there may be other factors during the time it takes to travel the remaining 19 miles that consume more battery energy or charge than anticipated such that the energy to travel the extra mile represented in the remaining expected range is consumed before the EV 102 reaches the destination.

In other examples, the threshold may be greater than 1 (e.g., 1.05, 1.1 etc.). In particular, the threshold may be greater than 1 when there is a considerable remaining distance to the trip destination and the remaining expected range of the EV 102 is estimated to be close to the remaining trip distance. For example, a remaining trip distance of 21 miles with a remaining expected range of 20 miles results in a ratio of more than 1 (21/20=1.05) indicating the EV 102 will not be able to make it to the trip destination. However, with such a remaining distance to travel, the EV 102 may actually consume less energy than anticipated due to inaccuracies in determining the remaining distance (e.g., based on a deviation from an expected path) and/or estimating the expected remaining range (e.g., based on the EV 102 being operated in a manner that reduces energy usage). Thus, the EV 102 may be able to make up the one mile of deficiency in the remaining expected range in the above example over the course of the 21 miles to the trip destination. As a result, the EV 102 may be able to reach the desired destination without the need for a battery charge (i.e., before the electrical energy stored in the battery assembly 106 is depleted). Thus, regardless of whether the ratio is above or below a specified threshold, the charge monitoring system 114 may suppress a request for a battery charge until the remaining expected range of the vehicle is under a threshold (e.g., less than 10 miles left) and/or the battery charge level is below a corresponding battery charge level threshold (e.g., less than 10% of a fully charged condition).

While the examples described herein are described with respect to a ratio of the remaining trip distance to the remaining expected range of the EV 102, a request for a battery charge from an MCU 104 may be triggered without actually calculating the ratio. In some examples, the difference between the remaining trip distance and the remaining expected range may be used to determine when the ratio exceeds a threshold. For instance, zero difference (i.e., the remaining expected range is equal to the remaining trip distance) corresponds to a ratio of 1. If the difference indicates the remaining expected range is higher than the remaining trip distance, the corresponding ratio would be less than 1. Similarly, if the difference indicates the remaining expected range is lower than the remaining trip distance, the corresponding ratio would be greater than 1. The ratio resulting from a particular difference between the remaining trip distance and the remaining expected range depends on the value of the two distances. Using the above noted example, a remaining trip distance of 21 miles and a remaining expected range of 20 miles (for a difference of 1 mile) results in a ratio slightly above 1 (21/20=1.05). By contrast, a remaining trip distance of 2 miles and a remaining expected range of 1 mile (again corresponding to a difference of 1 mile) results in a ratio substantially greater than 1 (2/1=2).

As noted above, when the remaining expected range is only 1 mile deficient of a 21 mile remaining trip distance, arranging a rendezvous with an MCU 104 may be unnecessary as the 1 mile deficiency may be gained if less battery energy is depleted than expected during the remainder of the trip. However, it is unlikely that a 1 mile deficiency in a remaining expected range can be gained when the total remaining trip distance is only 2 miles (i.e., the remaining expected range is at 1 mile) such that a battery charge is likely to be necessary. It is likely that a request for a battery charge would have been triggered prior to the remaining expected range reaching such a low value. However, this example is provided to illustrate that using the difference between the remaining expected range and the remaining trip distance to determine when a request for a battery charge should be made depends upon the relative size of the remaining trip distance. That is, in some examples, the particular difference that would trigger a request for a battery charge (corresponding to a ratio exceeding a threshold) may vary based upon the remaining trip distance.

In some examples, both the ratio of the remaining trip distance to the remaining expected range of the EV 102 and the difference the remaining trip distance to the remaining expected range of the EV 102 may be used to determine when to request a battery charge rendezvous. For example, a battery charge may be triggered when either (or both) of the ratio exceeds a first threshold and the difference exceeds a second threshold.

There may be times when the remaining trip distance of the EV 102 is greater than a maximum driving range of the EV 102 (e.g., an expected range of the EV 102 when the battery assembly 106 is fully charged). In such a situation, at least one battery charging process (and possibly more) will be necessary such that a request for a battery charge rendezvous may be triggered without comparing the remaining trip distance to the remaining expected range of the EV 102. However, in some such examples, the remaining expected range may be taken into consideration in generating the request because the remaining expected range of the EV 102 can impact the number of battery charges needed for the trip. For example, assuming the remaining trip distance of the EV 102 is 75 miles but the maximum driving range of the EV 102 (with a fully charged battery) is 50 miles, recharging the battery assembly 106 within 25 miles of the current location of the EV 102 (e.g., before the remaining trip distance is reduced to less than 50 miles) would result in the need for a second battery charge before arriving at the final destination. However, if the EV 102 can reach beyond the 25 mile point of the total remaining trip distance with its current battery charge level (e.g., a remaining expected range of 30 miles), then the trip can be completed with only one battery charge along the route to the destination if the battery charge is arranged to occur within a target travel distance to a rendezvous location in the range between the 25 mile point and the remaining expected range of the EV 102. Accordingly, in some examples, the request for a battery charge includes information identifying the target travel distance (range) such that the battery charge rendezvous corresponds to a location more than the 25 miles from the current location of the EV 102 but before the battery assembly 106 needs a charge (i.e., before the remaining expected range of the EV 102 reaches zero).

For comparison, if the current remaining expected range in the above example is 15 miles (or the remaining trip distance is 105 miles) at least two battery charges would be needed during the trip. In some examples, the charge monitoring system 114 determines the smallest number of charges needed to enable the EV 102 to travel the full trip distance and determines the approximate locations (e.g., distances along the expected route) where those charges need to occur. Based on these determinations, the charge monitoring system 114 may generate a request corresponding to each of the charge rendezvous expected during the trip. In some examples, the request for some or all of the expected charge rendezvous may be transmitted at or near the same time during the beginning of the trip, to reserve the both the initial battery charge and one or more subsequent charges, even though the later charges will not be needed for a considerable amount of time. Early reservation in this manner may increase the reliability that the MCU 104 will be available. This also allows more time for an MCU 104 to respond to the request and arrive at the specified rendezvous location proximate in time to when the EV 102 is scheduled to arrive. This is especially helpful for long trips that extend between different cities and/or otherwise pass through areas where there may be relatively few or no MCUs 104 immediately available.

For example, assume the EV 102 has a maximum driving range of 50 miles with a current remaining expected range of 15 miles and a remaining trip distance of 105 miles. If the EV 102 obtains a battery charge immediately, the EV 102 would require two additional charges to reach the trip destination for a total of three battery charges for the trip. That is, the first charge would enable the EV 102 to travel another 50 miles, the second charge would enable the EV 102 to travel another 50 miles (to 100 miles), and the third charge would be needed to travel the last 5 miles. By contrast, if the EV 102 were to travel its current remaining expect range (15 miles) before obtaining a charge, only one additional charge would be necessary for a total of two charges for the trip. That is, the current battery charge level would enable the EV 102 to travel 15 miles, the first charge would enable the EV 102 to travel another 50 miles (to 65 miles), and the second charge would enable the EV 102 to travel the remaining 40 miles (with 10 miles of remaining expected range upon arrival at the destination). Accordingly, in this example, the charge monitoring system 114 may generate requests for battery charges in locations approximately 15 and 65 miles from the current location of the EV 102. While the above example is described with respect to the EV 102 travelling its full maximum driving range (e.g., 50 miles) between charges, the charge monitoring system 114 may define distances between the successive battery charges in the request that are less than the maximum driving range of the EV 102 by a threshold (e.g., 5 miles to select locations 45 miles apart) to provide a cushion or safety factor for variability in the consumption of electrical energy stored in the battery assembly 106 while driving.

In the illustrated example of FIG. 1, the EV mobile charge system 110 is provided with the example communication system 122 to transmit a request for a battery charge. In some examples, the request is transmitted automatically when the charge monitoring system 114 determines that the ratio of the remaining trip distance to the remaining expected range of the EV 102 exceeds a threshold as described above. In other examples, the charge monitoring system 114 first prompts a user of the EV 102 to confirm whether the request should be transmitted. For example, the charge monitoring system 114 may generate an alert or other indication (e.g., provided via the user interface 126) that the battery assembly 106 is likely to need a charge (i.e., reach a battery charge level where the battery assembly 106 can no longer supply sufficient power to the motor(s) 107 to propel the EV 102) before the EV 102 reaches the trip destination and then request user feedback on how to proceed. In some examples, the request for a battery charge is transmitted directly to the MCU 104 (e.g., via a direct radio communication). In other examples, the request is transmitted via a network 128 (e.g., a cellular network, a satellite network, etc.) as shown in FIG. 1. In some examples, the request is transmitted to a remote server 130 and the server 130 processes and/or analyzes the information included in the request to then arrange and/or determine a rendezvous location with the MCU 104.

The MCU 104 may respond to the request by providing information associated with its availability to provide a battery charge to the EV 102. More particularly, if the MCU 104 is available for immediate dispatch to the EV 102, the MCU 104 may provide its current location with an indication it is available to respond to the request. The MCU 104 may not always be immediately available. For example, at the time of the request from the EV 102, the MCU 104 may be responding to a different request for a battery charge from a different EV. In such an example, the MCU 104 may provide the location where the MCU 104 will meet the other EV (whether already there or currently en route) and provide a time of availability as the estimated time of completion of the battery charge of the other EV. In some examples, the MCU 104 may provide additional information such as, for example, the cost of a battery charge and/or the rate (e.g., speed) at which the MCU 104 can implement the charge.

In some examples, the request for a charge from the EV 102 may be transmitted to multiple MCUs 104 in different locations in the vicinity of the EV 102. In such examples, each of the MCUs 104 may respond to the request with relevant information concerning their availability to respond to the request. Based on the availability of one or more MCUs 104, the rendezvous selection system 124 may determine a suitable rendezvous location where the EV 102 and the MCU 104 may meet to charge the battery assembly 106 of the EV 102.

In some examples, the rendezvous selection system 124 may identify multiple possible rendezvous locations (associated either with one MCU 104 or multiple different MCUs 104) and rank or rate each location based on one or more parameters associated with a characteristic of the battery charge services provided by the different MCUs, a characteristic of the timing or scheduling of the battery charge, a characteristic of convenience to the EV user, a characteristic of a travel time or travel distance (of the EV 102 and/or the MCU 104), a characteristic of the rendezvous location, a convenience to EV user, and/or other considerations. However, one constraint may be that the rendezvous location to be selected is to be a distance from the current location of the EV 102 that is less than the remaining expected range of the EV 102. Otherwise, the EV 102 may not be able to reach the rendezvous location. The amount that the distance to the rendezvous location is less than the remaining expected range may correspond to a safety factor.

In some examples, the rendezvous selection system 124 may rank different rendezvous locations based on one or more battery charge service characteristics. Battery charge service characteristics correspond to the services provided by the responding MCU 104 (as compared with other MCUs). For example, different MCUs 104 may have different types of electrical connectors. Additionally or alternatively, different MCUs 104 may provide different charging rates (e.g., speed of delivery of a battery charge). The cost of a battery charge is another battery charge service characteristic that may differ from one MCU 104 to another (e.g., based on different charging speeds and/or prices set by the different operators of the different MCUs 104). In some examples, the cost per unit energy may be fixed independent of the rendezvous location. In other examples, the cost of a battery charge may vary based on how far the MCU 104 must travel to reach the rendezvous location. In other words, rendezvous location rankings may be based on a travel distance the MCU 104 from its current location to the rendezvous location. In some examples, rendezvous locations corresponding to MCUs 104 that offer faster and/or less expensive battery charges are ranked higher than locations corresponding to MCUs 104 providing slower and/or more expensive charges.

In some examples, the rendezvous selection system 124 may rank different rendezvous locations based on one or more battery charge scheduling characteristics. Battery charge scheduling characteristics correspond to the timing and/or scheduling of a battery charge. For example, different rendezvous locations may be ranked based on the expected amount of time to elapse before the EV 102 is expected to arrive at each location. If a user wants to initiate the battery charge as soon as possible, locations arrived at sooner may be ranked higher. By contrast, if a user desires to travel as far as possible before stopping for the battery charge, locations that take more time to reach (e.g., further along the expected route of the EV 102) may be ranked higher. Additionally or alternatively, in some examples, a rendezvous location may be ranked based on a waiting period corresponding to the amount of time the EV user needs to wait at the rendezvous location before the MCU 104 is expected to arrive. Another example battery charge scheduling characteristic includes the expected duration of an electric battery charge (e.g., based on the amount of charge needed and the charge rate (speed) provided by the MCU 104).

In some examples, the rendezvous selection system 124 may rank different rendezvous locations based on one or more user convenience characteristics. User convenience characteristics correspond to the convenience of the circumstances surrounding a battery charge at a possible rendezvous location. For example, a rendezvous location may be ranked based on a diversion time corresponding to the anticipated time added to an expected duration of the trip of the EV 102 if no battery charge were necessary. In some examples, the rendezvous selection system 124 may rank a rendezvous location based on a diversion distance corresponding to a distance off the expected route of the EV 102 to the rendezvous location. In other words, rendezvous location rankings may be based on the distance between the EV 102 and the rendezvous location and/or the associated time to travel that distance.

Even where the amount of diversion (time or distance) from the expected route of the EV 102 to a rendezvous location may be minimal, the distance between the EV 102 and the rendezvous location (and/or the associated time to travel that distance) may still affect a ranking of the location. For example, where the remaining expected range for the EV 102 is relatively large (but still insufficient to reach the trip destination) the EV 102 may be able to drive an appreciable distance/time before needing a battery charge. However, there may be reasons why selecting an earlier rendezvous location may be beneficial (e.g., to avoid risking the battery charge level/remaining expected range falling too low, based on a user preference, etc.).

In other examples, it may be beneficial to arrange the rendezvous location nearer to a location where the EV 102 will need a charge (e.g., near where the energy stored in the battery assembly 106 is expected to be depleted). For example, as described above, for especially long trips, the remaining trip distance of the EV 102 may be greater than a maximum driving range of the EV 102 (e.g., the expected range when the battery assembly 106 is fully charged). In such examples, if the rendezvous location is near to where the battery assembly 106 will need a charge, the number of charges needed before arriving at a final destination may be reduced. Thus, in some examples, rendezvous location rankings may be based on the remaining expected range of the EV 102 and/or the number of battery charges expected before arriving at the trip destination. Further, as noted above, when multiple battery charges are to be arranged for a single trip, the rendezvous selection system 124 may select successive rendezvous locations that are spaced a distance that is less than the maximum driving range of the EV 102 by a threshold to ensure that the EV 102 will be able to make it from one battery charge location to the next.

In some examples, the rendezvous selection system 124 may rank different rendezvous locations based on one or more battery charge location characteristics. Battery charge location characteristics correspond to characteristics of the particular location identified for the battery charge. For example, different rendezvous locations may be ranked based on their safety. More particularly, in some examples, the safety of a location may be based on an analysis of the immediate surroundings of the location (e.g., being in a parking lot versus being on the side of a busy road). Additionally or alternatively, in some examples, the safety of a location may be based on information corresponding to the general area of the possible rendezvous location (e.g., crime statistics for the area). Further, whether analyzed with respect to safety or more generally, locations may be ranked based on an analysis of the type of neighborhood (e.g., residential, commercial, industrial, etc.) and/or the types of amenities and/or activities offered nearby (e.g., shopping malls/stores, restaurants, gas stations, etc.). Further, in some examples, location rankings are based on prior user ratings of the locations.

Figure 2:
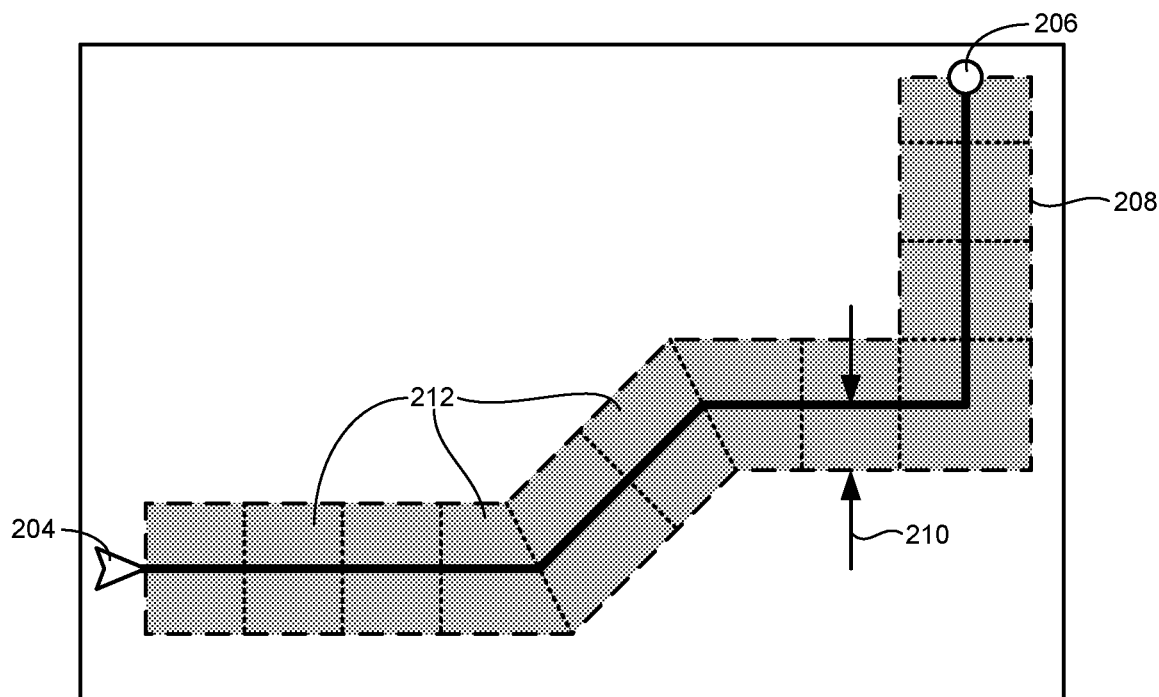
FIG. 2 illustrates example regions in a map associated with an expected route from a current location to a trip destination of the EV of FIG. 1.
Figure 3:
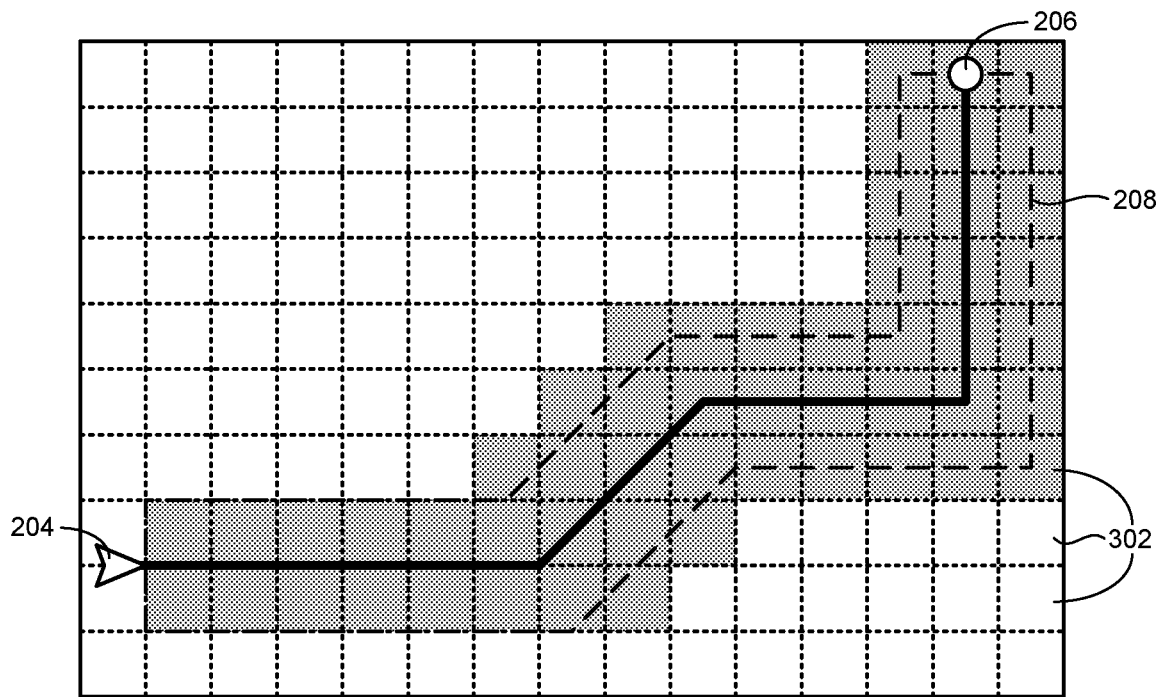
FIG. 3 illustrates other example regions in a map associated with an expected route from a current location to a trip destination of the EV of FIG. 1.

In some examples, the rendezvous selection system 124 determines the characteristics of a possible rendezvous location in substantially real-time (e.g., when a rendezvous location is to be identified). In other examples, general characteristics of rendezvous locations may be assessed in advance based on an analysis of predefined areas within a city or other geographic region. These differing approaches are explained in connection with FIGS. 2-3. FIGS. 2 and 3 are representative of a map showing the expected route 202 of an EV 102 between its current location 204 and a trip destination 206. For purposes of explanation and clarity, all roads other than the expected route 202 have been omitted. In some examples, the rendezvous selection system 124 identifies an area 208 extending along the expected route 202 of the EV 102 within which to select possible rendezvous locations. In some examples, the area 208 is defined to be within a threshold distance 210 of the expected route 202. By defining an outer boundary of the area 208 in this manner, the example rendezvous selection system 124 may reduce the potential amount of diversion off of the expected route 202 for the EV to reach the rendezvous location eventually selected for a battery charge. In some examples, the threshold distance may be any suitable distance (e.g., two blocks, five blocks, half a mile, etc.).

In some examples, as shown in FIG. 2, the rendezvous selection system 124 divides the area 208 into multiple regions 212. In some examples, each region may correspond to a set length (e.g., one quarter mile) along the expected route. In some examples, each side of the expected route may correspond to a different region 212. In other examples, smaller regions and/or regions of different sizes may alternatively be defined. The rendezvous selection system 124 may analyze each region 212 to determine relevant characteristics to be imputed to any particular rendezvous location positioned within the region 212. That is, for each region 212, the rendezvous selection system 124 may identify the type of neighborhood, identify the number and/or types of stores, or other amenities within the region 212, and analyze available crime statistics and/or other available information to assign a general ranking to the region. In some such examples, the general ranking of a region 212 may be used in assigning a specific ranking to a particular location within the region 212 being considered for a rendezvous with an MCU 104. In some examples, the rendezvous selection system 124 identifies a single possible rendezvous location within each region 212 to develop the full pool of possible rendezvous locations from which a final location is to be selected. In some examples, less than all of the regions 212 within the area 208 are analyzed because they are beyond the remaining expected range of the EV 102. Alternatively or additionally, the regions 212 could each be small enough to only include one possible rendezvous location, such as one store parking lot.

Alternatively, as illustrated in FIG. 3, the city represented by the illustrated map may be divided into discrete regions 302 that are analyzed for the same characteristics as described above (crime, available amenities, etc.) and stored at a central server (e.g., the server 130) prior to the EV 102 requesting a battery charge from an MCU 104. In some examples, once such a request is received, the rendezvous selection system 124 may identify (e.g., access or retrieve from the server 130) the regions 302 that fall within the area 208 that extends along the expected route 202 and use the predetermined rankings for the regions 302 to define rankings for particular rendezvous locations between the EV 102 and an MCU 104. In some examples, only the regions 302 within the area 208 that are within the remaining expected range of the EV 102 are analyzed. Depending on the size of the area 208 (e.g., based on the threshold distance 210) and the size of the regions 302, the rendezvous selection system 124 may identify any region 302 that is at least partially within the area 208 (e.g., the shaded regions 302 in FIG. 3). In other examples, the rendezvous selection system 124 may identify only the regions 302 that are entirely within the area 208.

Returning to the description of FIG. 1, the different parameters and/or characteristics used to rank rendezvous locations may not necessarily be mutually exclusive. For example, a longer expected battery charge (due to a slower charge rate) may be less of a concern if the rendezvous location is in a safe location that offers amenities (e.g., a store or restaurant) where the EV user may go while waiting for the charge to complete. Thus, in some examples, the rendezvous selection system 124 may rank different rendezvous locations based on a combination of some or all of the parameters outlined above and/or based on other factors.

In some examples, the rendezvous selection system 124 automatically selects the rendezvous location for the EV 102 and the MCU 104 based on the rankings (e.g., automatically selecting the highest ranked location). In other examples, the rendezvous selection system 124 may present multiple possible rendezvous locations to a user of the EV 102 (e.g., via the user interface 126) for the user to select. In some such examples, the options are presented to the user in an ordered format based on the rankings. In some examples, the different parameters or factors considered in ranking rendezvous locations are given different weightings based on user preferences, thereby affecting the order in which they are presented to the user. In some examples, the rendezvous locations are ordered based on a particular parameter selected by the user (e.g., list closest locations first, list shortest waiting periods first, list least expensive locations first, etc.).

In the illustrated example, once the rendezvous selection system 124 selects a particular rendezvous location (either automatically or based on a user selection), the rendezvous location is transmitted to the MCU 104 to enable the MCU 104 to be guided to the location. In some examples, an estimated arrival time of the EV 102 to the rendezvous location is also provided to the MCU 104. Additionally, in some examples, the identified rendezvous location is provided to the navigation system 118 of the EV 102 to guide the EV 102 to the rendezvous location. In some examples, the navigation guidance may provide verbal cues and/or directions on a map displayed via the user interface 126. In some examples, the MCU 104 transmits its location to the EV 102 in substantially real-time so that an indication of the MCU 104 may be displayed on the map relative to a current location of the EV 102 and/or the rendezvous location.

In some examples, one or both of the EV 102 and the MCU 104 are autonomously driven to the rendezvous location. In this manner, there is less likely to be deviations in the expected route of the EV 102 and/or the MCU 104 and/or the expected travel times such that the estimations of waiting periods and distances may be more reliable.

In some examples, one or more of the elements in the EV mobile charge system 110 may additionally or alternatively be implemented separately from the EV 102. For example, the rendezvous selection system 124 may alternatively be implemented by the MCU 104. In other examples, the rendezvous selection system 124 may be implemented remotely via the server 130 in communication with the EV 102 and the MCU 104. Of course, the rendezvous selection system 124 being implemented remotely from the EV 102 may affect the type of information that is included in the request for a battery charge. For instance, if the server 130 is to determine the location for a rendezvous location, the request from the EV 102 may include the current location of the EV 102, the trip destination of the EV 102, the remaining trip distance to the trip destination, the expected route of the EV 102, and/or the remaining expected range of the EV 102. The server 130 may then transmit the relevant information to one or more MCUs 104 and/or receive the relevant location and availability information as described above to then determine a rendezvous location (or multiple locations to be provided to the EV user for selection).

In some examples, multiple MCUs 104 may report their respective positions and availabilities to a central server (e.g., the server 130) in substantially real-time and/or as requested by the server 130 independent of a request from the EV 102. That is, in some examples, the server 130 may contain a database of the current positions and availabilities of a fleet of MCUs 104 to enable the server 130 to respond with the relevant information when the EV 102 requests a battery charge. In some examples, a particular MCU 104 may currently be responding to a request to charge a different EV. Accordingly, in some such examples, the MCU 104 may provide an expected position of the MCU at the time the MCU 104 is expected to become available (e.g., the location of the rendezvous with other EV when the associated battery charge is anticipated to be complete). In some examples, the substantially real-time positions (current position and/or expected position) and availabilities (and/or other information) of a fleet of MCUs 104 may be provided to EV user. In some examples, rather than presenting the user with multiple possible rendezvous locations along the expected route of the EV 102, the position, availability, and/or other information (e.g. cost of charges) of the different MCUs 104 may be provided for selection to the user independent of the expected route of the EV 102. In some such examples, the real-time positions and/or availabilities of the different MCUs 104 may be presented on a map to the user via the user interface 126. The user may select a particular MCU 104 and then the rendezvous selection system 124 (e.g., implemented at the server 130) determines a suitable rendezvous location. In some such examples, determining the particular travel route of the EV 102 is not necessary because the user can select the MCU 104 that is closest to where the user wants to go or otherwise on the way to the user's desired destination.

The cost of a battery charge from the MCU 104 may be greater than the cost to charge the battery assembly 106 if the EV 102 were able to reach its trip destination (e.g., where a stationary charging unit is available). Thus, the user of the EV 102 may not want to pay for any more electricity from the MCU 104 than is necessary for the EV 102 to travel the remaining trip distance to the trip destination. Accordingly, in some examples, the charge monitoring system 114 determines a target charge level for the battery assembly 106 corresponding to when the battery assembly has stored sufficient energy to provide a certain level of confidence or probability that the electric vehicle will reach the trip destination without needing an additional battery charge. The target charge level is associated with a level of confidence or probability because the exact distance that the EV 102 will be able to travel cannot be precisely determined. As described above, there are a number of factors (e.g., traffic, elevation gains/losses, use of air conditioner, etc.) that can affect how quickly energy stored in the battery assembly 106 is depleted. In some examples, the target charge level (and the associated probability) corresponds to when the charge level of the battery is associated with a remaining expected range of the EV 102 that exceeds the remaining trip distance by a threshold. When the battery assembly 106 is charged to a level corresponding to a remaining expected range that exceeds the remaining trip distance of the EV 102 from the rendezvous location (determined by the trip route analyzer 116) by a threshold (i.e., the battery is charged to the target charge level), the charge monitoring system 114 may generate a signal to stop the charging process.

In some examples, the threshold (above the remaining trip distance) depends upon the remaining trip distance of the EV 102. For example, if the EV 102 is 1 mile away from its desired destination, a threshold of 1 mile (for a remaining expected range of at least 2 miles) may be used to determine the target charge level that triggers the signal to stop the charging process. By contrast, if the EV 102 is 20 miles away from its trip destination, a threshold of 5 miles (or more) may be used to determine the target charge level that triggers the signal to stop the charging process. The larger threshold for a larger remaining trip distance compensates for the greater uncertainty associated with how the battery energy will be consumed during the remaining trip distance. That is, in some examples, to maintain a substantially consistent level of confidence or probability that the EV 102 will reach its desired destination, the threshold may be larger for longer remaining trip distances than shorter ones. Additionally or alternatively, other factors (e.g., traffic, elevation gains/losses, etc.) may also be taken into consideration when calculating the threshold and/or corresponding target charge level to achieve the desired probability.

Further, in some examples, that target charge level may be adjusted based on user input selecting a different probability that the EV 102 will reach the trip destination. For example, EV users may desire to assume an increased risk that they will not reach their desired trip destination by selecting a lower probability to reduce the cost and/or time of battery charge services from the MCU 104. In some such examples, the charge monitoring system 114 provides suggestions how to reduce the risk by, for example, turning off an air conditioner, choosing a different travel route based on real-time traffic updates, etc. In other examples, EV users may desire an increased probability so that their minds are at greater ease about reaching their desired destination (e.g., give them the option to make a possible detour from their expected travel route).

In some such examples, the charge monitoring system 114 calculates an additional cost to charge the battery assembly 106 to a higher target charge level associated with the higher probability. The additional cost may be calculated by multiplying the cost per unit of energy and the amount of energy needed to reach the higher target charge level. For example, assuming the additional amount of energy for the higher probability corresponds to 4 kWh of energy and the cost of the MCU 104 is 0.70/kWh, the total additional cost for the increased probability would be 2.80 (0.70/kWh×4 kWh). In some examples, the additional cost may be calculated as the cost above what the user would incur if the user were to charge the EV 102 at a stationary charging unit at the trip destination (e.g., at the user's home). For example, if the stationary charge unit costs the user 0.15/kWh, the charge of 4 kWh would cost 0.60 for a difference in costs of 2.20 if the user desires the higher probability.

Additionally or alternatively, in some examples, the charge monitoring system 114 calculates an additional time delay to charge the battery assembly 106 to a higher target charge level associated with the higher probability. The additional time delay may be calculated by dividing the amount of energy needed to reach the higher target charge level by a charging rate provided by the MCU 104. For example, assuming the MCU 104 is equipped with a 40 kW charger, increasing the battery charge level by the 4 kWh additional amount of energy would take an additional 0.1 hours (4 kWh÷40 kW) or six minutes.

In some examples, the charge monitoring system 114 presents (via the user interface 126) an option to the user of an EV to select a higher probability. In some such examples, the additional cost and/or the additional time delay is presented to a user along with the option to better inform the user about the option. In some examples, multiple different options associated with different probabilities may be presented to the user for selection. In some examples, other information may also be presented to users to further inform their decisions. For example, the location characteristics (e.g., safety ranking, nearby amenities/activities, etc.) may be provided so that the users can determine if they are willing to wait a longer duration at the rendezvous location. Furthermore, other criteria and/or additional information other than what is described above may additionally or alternatively be presented to users to help them make an informed decision when providing input to select a particular rendezvous location.

While an example manner of implementing the EV mobile charge system 110 of FIG. 1 is illustrated, one or more of the elements, processes and/or devices illustrated in FIG. 1 may be combined, divided, re-arranged, omitted, eliminated and/or implemented in any other way. Further, the example battery charge level monitor 112, the example charge monitoring system 114, the example trip route analyzer 116, the example navigation system 118, the example travel route database 120, the example communication system 122, the example rendezvous selection system 124, the example user interface 126, and/or, more generally, the example EV mobile charge system 110 of FIG. 1 may be implemented by hardware, software, firmware and/or any combination of hardware, software and/or firmware. Thus, for example, any of the example battery charge level monitor 112, the example charge monitoring system 114, the example trip route analyzer 116, the example navigation system 118, the example travel route database 120, the example communication system 122, the example rendezvous selection system 124, the example user interface 126, and/or, more generally, the example EV mobile charge system 110 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example battery charge level monitor 112, the example charge monitoring system 114, the example trip route analyzer 116, the example navigation system 118, the example travel route database 120, the example communication system 122, the example rendezvous selection system 124, and/or the example user interface 126 is/are hereby expressly defined to include a tangible computer readable storage device or storage disk such as a memory, a digital versatile disk (DVD), a compact disk (CD), a Blu-ray disk, etc. storing the software and/or firmware. Further still, the example EV mobile charge system 110 may include one or more elements, processes and/or devices in addition to, or instead of, those illustrated in FIG. 1, and/or may include more than one of any or all of the illustrated elements, processes and devices.

Flowcharts representative of example methods for implementing the EV mobile charge system 110 of FIG. 1 is shown in FIGS. 4-8. In this example, the methods may be implemented using machine readable instructions that comprise a program for execution by a processor such as the processor 912 shown in the example processor platform 900 discussed below in connection with FIG. 9. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIGS. 4-8, many other methods of implementing the example EV mobile charge system 110 may alternatively be used. For example, the order of execution of the blocks may be changed, and/or some of the blocks described may be changed, eliminated, or combined.

As mentioned above, the example methods of FIGS. 4-8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example methods of FIGS. 4-8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 4:
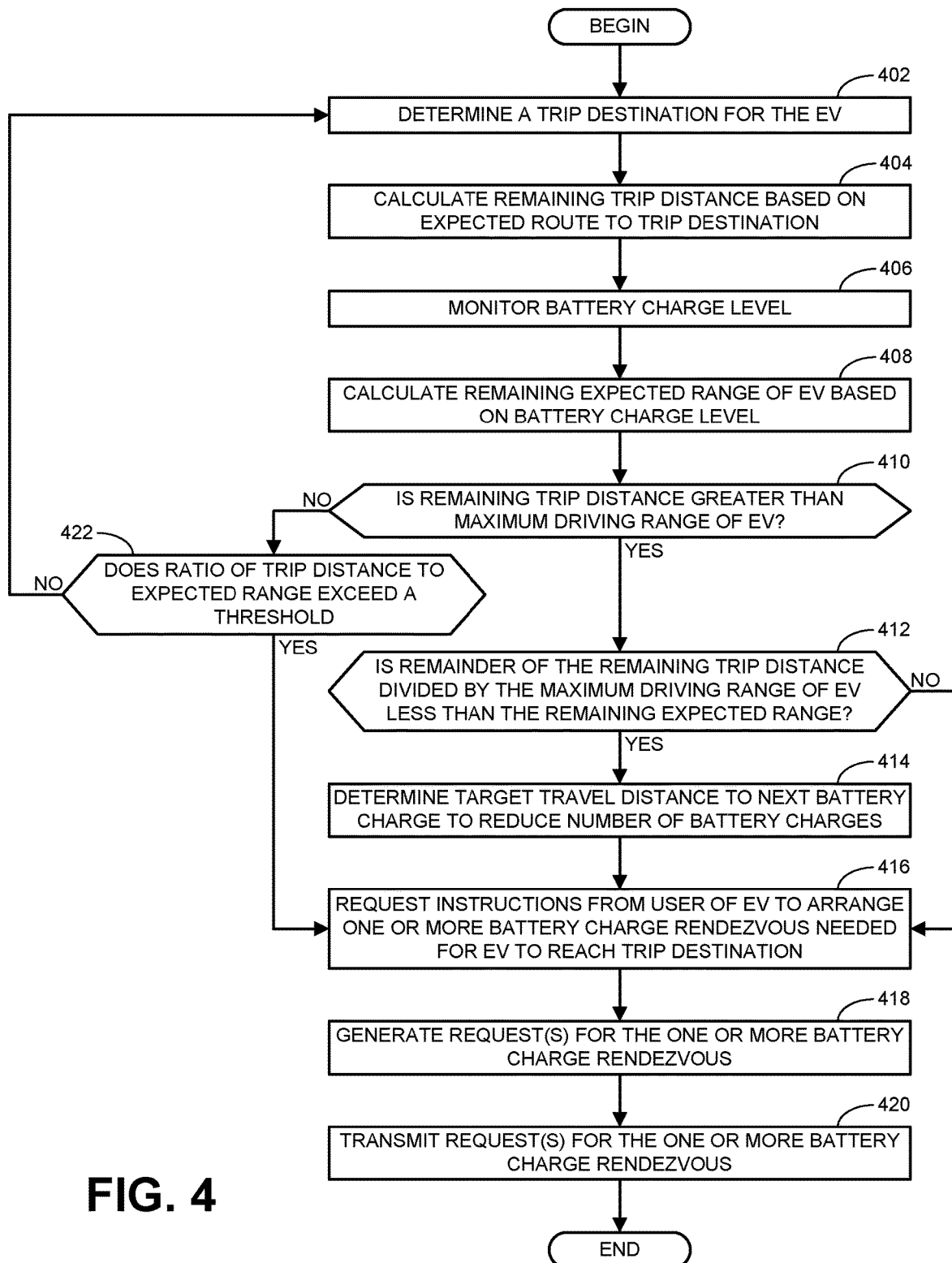
FIG. 4 is a flowchart illustrating an example method to implement the example EV mobile charge system of FIG. 1 to request one or more battery charge rendezvous.

Turning in detail to the drawings, FIG. 4 is a flowchart illustrating an example method to implement the EV mobile charge system 110 of FIG. 1 to request a battery charge rendezvous between the EV 102 and the MCU 104 of FIG. 1. The method of FIG. 4 begins at block 402 where the example trip route analyzer 116 determines a trip destination for the EV 102. In some examples, the trip destination corresponds to one or more locations associated with a stationary charging unit. In some such examples, the one or more locations are predefined by a user of the EV 102 independent of the direction of travel and/or route taken by the EV 102 at a particular point in time. Additionally or alternatively, in some examples, the trip destination may be determined based on the direction of travel and/or route taken by the EV 102 at particular points in time as explained more fully below in connection with FIG. 5. At block 404, the example charge monitoring system 114 calculates a remaining trip distance based on an expected route to the trip destination. In some examples, the charge monitoring system 114 uses the navigation system 118 to determine the expected route of the EV 102 and/or to calculate the trip distance.

At block 406, the example battery charge level monitor 112 monitors a battery charge level of the EV battery assembly 106. At block 408, the example charge monitoring system 114 calculates a remaining expected range of the EV based on the battery charge level. At block 410, the example charge monitoring system 114 determines whether the remaining trip distance is greater than the maximum driving range of the EV 102 (e.g., the expected range of the EV 102 with a fully charged battery). In some examples, this determination incorporates a desired reserve driving range as a safety factor. If the remaining trip distance is greater than the maximum driving range of the EV 102, at least one battery charge will be needed with the possibility that multiple battery charges may be needed before the EV 102 reaches the trip destination. Thus, under such circumstances, control advances to block 412 where the example charge monitoring system 114 determines whether the remainder of the remaining trip distance divided by the maximum driving range of the EV 102 is less than the remaining expected range. If so, control advances to block 414 where the example charge monitoring system 114 determines target travel distance to the next battery charge to reduce the total number of battery charges for the trip. That is, where the remainder calculated at block 412 is less than the remaining expected range of the EV 102 it may be possible to reduce the total number of battery charges if the EV 102 covers the distance of the remainder before stopping for a charge. Thus, the target travel distance corresponds to a travel range between the distance of the remainder and the remaining expected range of the EV 102. After determining the travel distances to reduce the number of battery charges (block 414), control advances to block 416 where the example charge monitoring system 114 requests instructions from a user of the EV 102 to arrange one or more battery charge rendezvous needed for the EV 102 to reach the trip destination. On the other hand, if the remainder calculated at block 412 is not less than the remaining expected range of the EV 102, the timing (travel distance) of subsequent battery charges will not affect the number of charges needed for the full trip such that control advances directly to block 416 to request instructions from the user. In some examples, the charge monitoring system 114 requests user instructions by generating an alert or other indication provided to the user via the example user interface 126 indicating the EV battery will need a charge before arriving at the trip destination.

In some examples, block 416 is omitted in the example method and control automatically advances directly to block 418 where the example charge monitoring system 114 generates a request for the one or more battery charge rendezvous. In some examples, the request includes relevant information necessary for a mobile charging unit to respond to the request. For example, the request may include the current location of the EV 102, the expected route of the EV 102, the travel distances to reduce the number of battery charges, the trip destination of the EV 102, the remaining expected range of the EV 102, and/or the remaining trip distance of the EV 102. At block 420, the example communication system 122 transmits the request for the one or more battery charge rendezvous. Thereafter, the example method of FIG. 4 ends.

Returning to block 410, if the example charge monitoring system 114 determines that the remaining trip distance is not greater than the maximum driving range of the EV 102 (indicating that, at most, only one battery charge will be needed), control advances to block 444. At block 444, the example charge monitoring system 114 determines whether the ratio of the remaining trip distance to the remaining expected range exceeds a threshold. If not, control returns to block 402. If the example charge monitoring system 114 determines that the ratio of the remaining trip distance to the remaining expected range does exceed the threshold, control advances to block 216 to request instructions from the user, to then generate a request for a battery charge rendezvous (block 418), and to transmit the request (block 440) before the example method of FIG. 4 ends.

Figure 5:
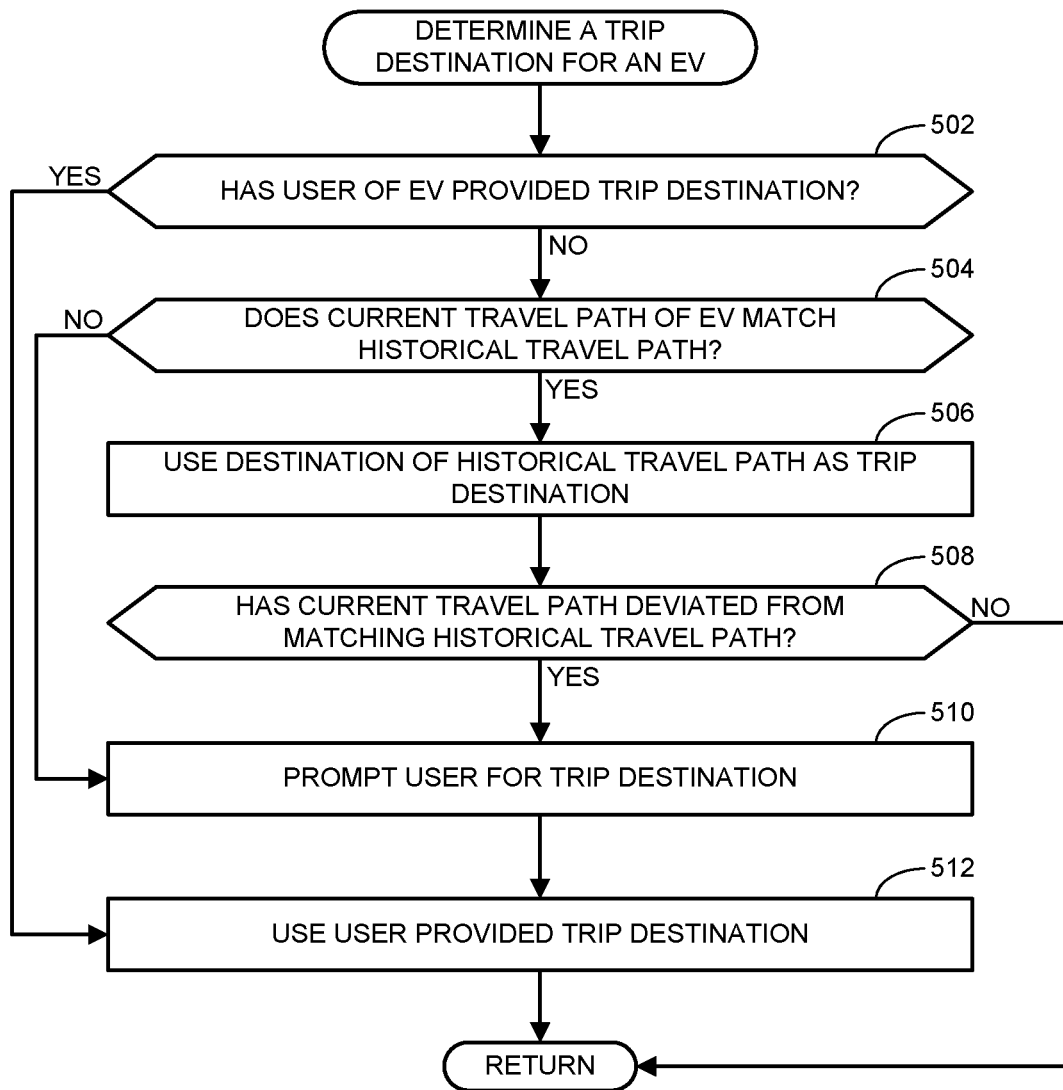
FIG. 5 is a flowchart illustrating an example method to implement the example EV mobile charge system of FIG. 1 to determine a trip destination for the EV.

FIG. 5 is a flowchart illustrating an example method to implement the example EV mobile charge system 110 of FIG. 1 to determine a trip destination for the EV 102. In some examples, the example method of FIG. 5 may be used to implement block 402 of the example method of FIG. 4. The method of FIG. 5 begins at block 502 where the example trip route analyzer 116 determines whether the user of the EV 102 has provided a trip destination. In some examples, the user may have provided the trip destination via the user interface 126 to obtain navigation assistance from the navigation system 118. If the example trip route analyzer 116 determines that the user of the EV 102 has provided a trip destination, control advances to block 512 where the example trip route analyzer 116 uses the user provided trip destination. Thereafter, the example method of FIG. 5 ends and returns to complete the example method of FIG. 4.

If the example trip route analyzer 116 determines that the user of the EV 102 has not provided a trip destination, control advances to block 504 where the example trip route analyzer 116 determines whether the current travel path or route of the EV 102 matches a historical travel path. Historical travel paths of the EV 102 may be stored in the example travel route database 120 for comparison to the current travel path of the EV 102. If the example trip route analyzer 116 determines that the current travel path of the EV 102 does match a historical travel path (e.g., the current travel path is recognizable), control advances to block 506 where the example trip route analyzer 116 uses the destination of the historical travel path as the trip destination.

At block 508, the example trip route analyzer 116 determines whether the current travel path of the EV 102 has deviated from the matching historical travel path. Such a deviation may indicate that the EV 102 is not on the same route as defined by the historical travel path. Thus, in some examples, the trip destination may be repeatedly calculated and/or updated based on the continued monitoring of the location and travel direction of the EV 102. If the example trip route analyzer 116 determines that the current travel path of the EV 102 has not deviated from the matching historical travel path (i.e., the paths still match), the example method of FIG. 4 ends and returns to complete the example method of FIG. 4. However, if the example trip route analyzer 116 determines that the current travel path of the EV 102 has deviated from the matching historical travel path (i.e., the paths no longer match), control advances to block 510 where the example user interface 126 prompts the user for a trip destination.

Returning to block 504, if the example trip route analyzer 116 determines that the current travel path of the EV 102 does not match a historical travel path, control directly advances to block 510 to prompt the user to identify the trip destination. Thereafter, control advances to block 512 where the example trip route analyzer 116 uses the user provided trip destination, after which the example method of FIG. 5 ends and returns to complete the example method of FIG. 4.

Figure 6:
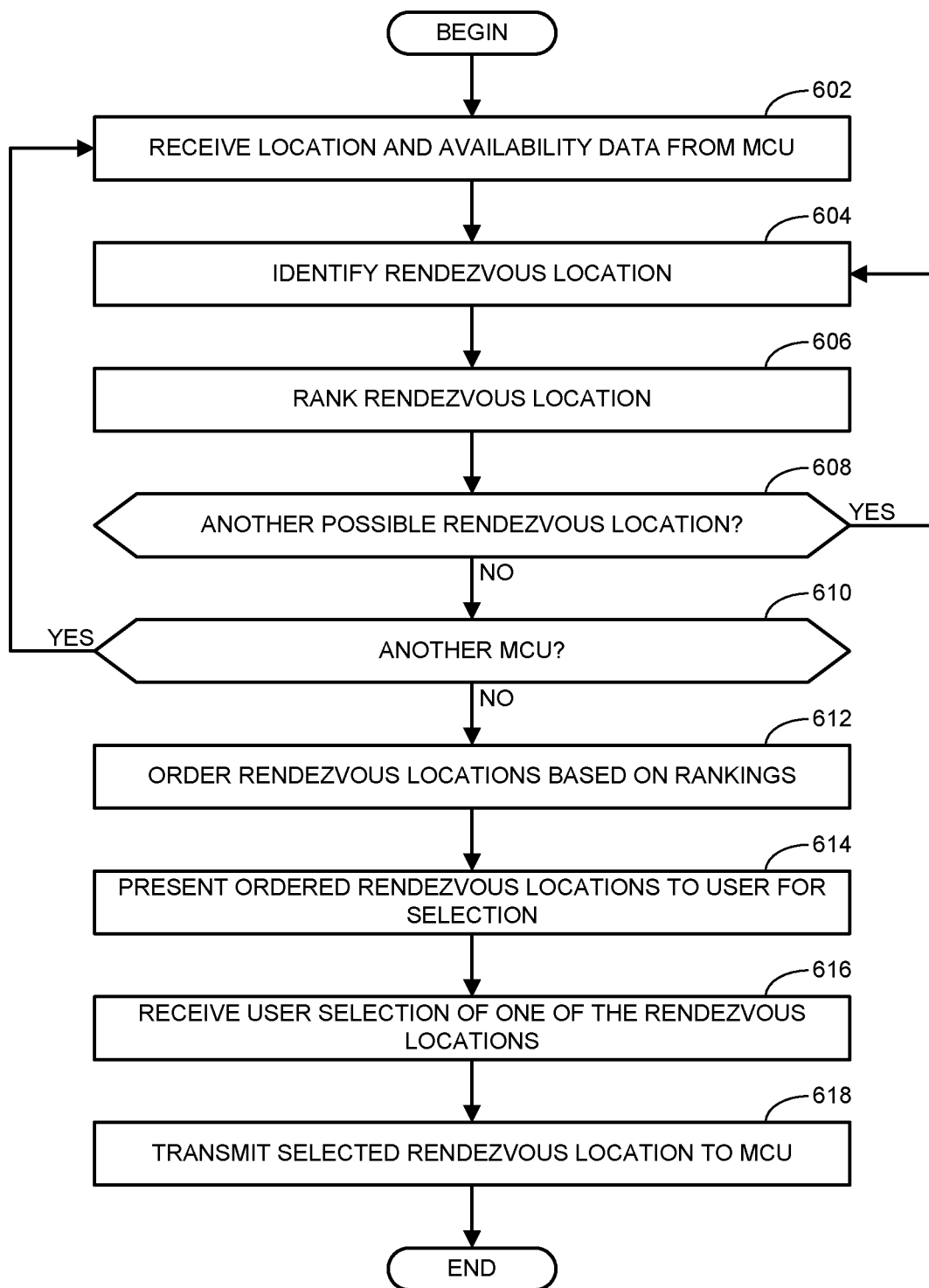
FIG. 6 is a flowchart illustrating an example method to implement the example EV mobile charge system of FIG. 1 to identify a rendezvous location.

FIG. 6 is a flowchart illustrating an example method to implement the example EV mobile charge system 110 of FIG. 1 to identify a rendezvous location. As mentioned above, the determination of the rendezvous location may be determined by the EV mobile charge system 110 of the EV 102. However, in other examples, the rendezvous location may be determined by the MCU 104 and/or at another location remote from the EV 102 (e.g., via the server 130). For purposes of explanation, the example method of FIG. 6 is described as being implemented by the EV mobile charge system 110 of the EV 102, but the example method of FIG. 6 can be suitably adapted for implementation at a location remote from the EV 102. An additional alternate implementation for the remote server 130 to identify a rendezvous location in response to a request for a battery charge from the EV 102 is provided below in connection with FIG. 7.

The example method of FIG. 6 begins at block 602 where the communication system 122 receives location and availability data from the MCU 104. In some examples, this data may be received directly from the MCU 104 (e.g., via a direct radio communication). In other examples, this data may be received indirectly over the network 128 via the server 130. At block 604, the example rendezvous selection system 124 identifies a rendezvous location. In some examples, the rendezvous location is based on the location and availability of the MCU 104 as well as the location, expected route, and remaining expected range of the EV 102. In some examples, the identified rendezvous location corresponds to a particular region within an area extending along the expected route of the EV 102.

At block 606, the example rendezvous selection system 124 ranks the rendezvous location. In some examples, the ranking of the rendezvous location may be based on one or more factors including (1) a waiting period for the EV 102 at the rendezvous location before the MCU 104 arrives, (2) a diversion time for the EV 102 to go to the rendezvous location, (3) a diversion distance from the expected route of the EV 102, (3) a travel time for the EV 102 before arriving at the rendezvous location, (4) a speed and/or a corresponding expected duration of the battery charge, (5) a travel distance between the current location of the EV 102 and the rendezvous location, (6) a travel distance between the current location of the MCU 104 and the rendezvous location, (7) a cost of the battery charge, (8) a number of battery charges expected before arriving at the trip destination (based on the remaining trip distance from the rendezvous location and the maximum driving range of the EV 102), (9) an anticipated remaining expected range of the EV 102 after arriving at the rendezvous location, (10) a safety characteristic of the rendezvous location, (11) an availability of amenities and/or activities near the rendezvous location,

(12) a type of neighborhood surrounding the rendezvous location, (13) a prior user rating of the rendezvous location, etc. In some examples, the different factors may be weighted differently based on user preferences and/or user inputs.

At block 608, the example rendezvous selection system 124 determines whether there is another possible rendezvous location. In some examples, another possible rendezvous location is identified when there is another region (e.g., the regions 212 of FIG. 2 or the regions 302 of FIG. 3) within an area (e.g., the area 208) extending along the expected route of the EV 102 that has not yet been analyzed. If the example rendezvous selection system 124 determines that there is another possible rendezvous location (block 408), control returns to block 604. Otherwise, control advances to block 610, where the example rendezvous selection system 124 determines whether there is another MCU 104. If so, control returns to block 602. Otherwise, control advances to block 612. In some examples, only the nearest MCU 104 to each region 212, 302 is considered for that particular region 212, 302. That is, in such examples, only one possible rendezvous location is identified for each region 212, 302. In other examples, each region 212, 302 may be considered with respect to multiple different MCU 104 within the vicinity for a possible rendezvous location.

At block 612, the example rendezvous selection system 124 orders the rendezvous locations based on the rankings. At block 614, the example user interface 126 presents the ordered rendezvous locations to the user for selection. In some examples, the user may interact with the ordered list of rendezvous locations to filter and/or reorder locations based on a different weighting of the ranking factors and/or specific ordering criteria. In some examples, the user may be presented with only the highest ranked rendezvous location rather than presenting multiple possible locations to the user. At block 616, the example user interface 126 receives a user selection of one of the rendezvous locations.

At block 618, the example communication system 122 transmits the selected rendezvous location to the MCU 104. Additionally, in some examples, the MCU 104 is provided with an anticipated time of arrival of the EV 102 at the rendezvous location and/or an anticipated time that the MCU 104 should arrive at the rendezvous location to charge the battery assembly 106 of the EV 102. After the selected rendezvous location (and/or other information) is transmitted to the MCU 104, the example method of FIG. 6 ends.

Figure 7:
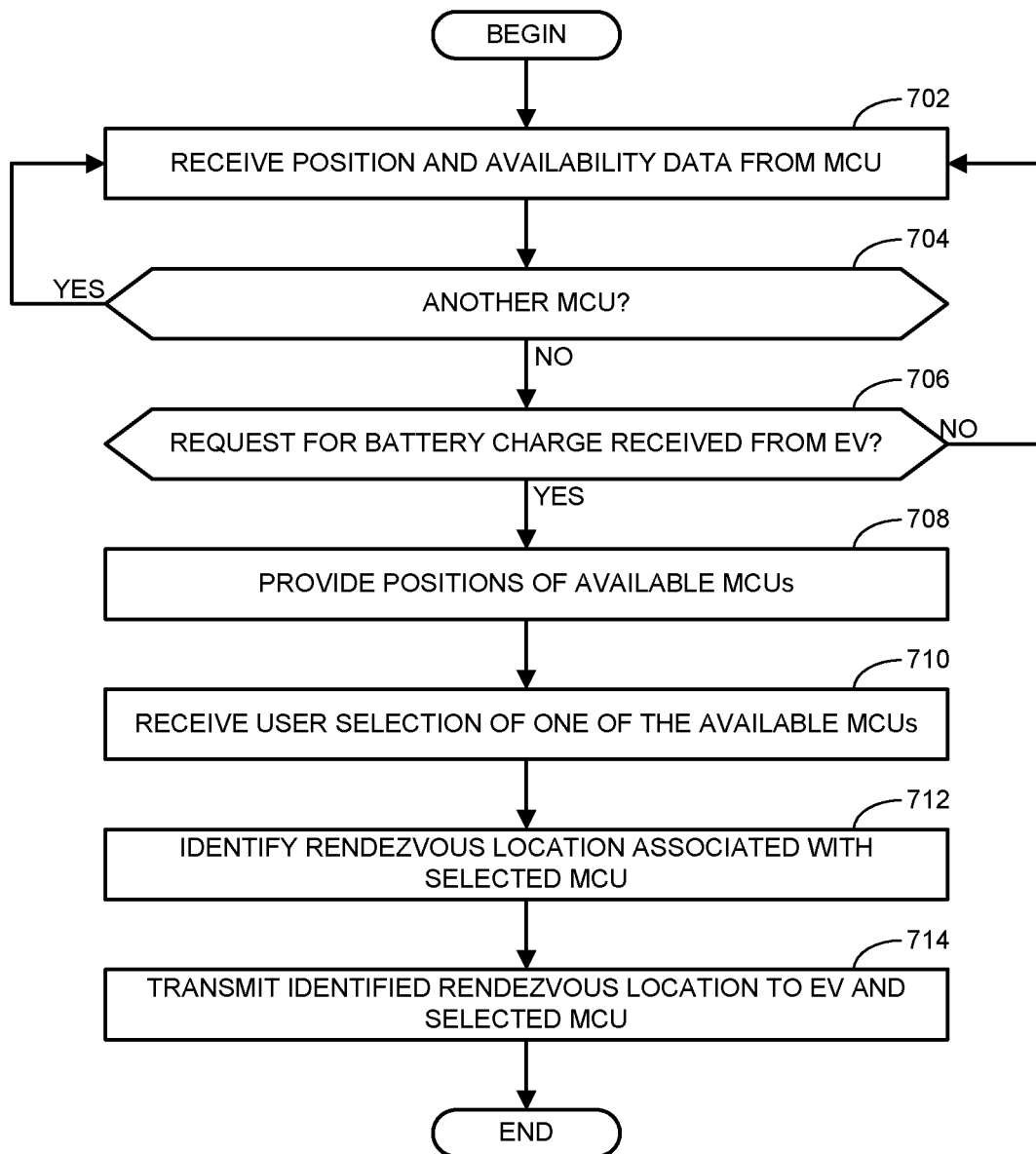
FIG. 7 is a flowchart illustrating an example method to implement the example server of FIG. 1 to identify a rendezvous location for an EV and a mobile charging unit (MCU).

FIG. 7 is a flowchart illustrating an example method to implement the example server 130 of FIG. 1 to identify a rendezvous location. The example method of FIG. 7 begins at block 702 where the example server 130 receives position and availability data from the MCU 104. In some examples, the server 130 may request the position and availability data from the MCU 104. In other examples, the MCU 104 automatically reports the data. In some examples, the position of the MCU 104 corresponds to a current position if the MCU is currently available. If the MCU 104 is not currently available, the reported position may correspond to an expected position of the MCU 104 when the MCU 104 is expected to become available (e.g., after providing a charge to a different EV). At block 704 the example server 130 determines whether there is another MCU 104. If so, control returns to block 702. Otherwise, control advances to block 706 where the example server 130 determines whether a request for a battery charge has been received from the EV 102. If not, control returns to block 702 to collect updated position and availability data from the MCUs 104.

If the example server 130 has received a request for a battery charge (block 706), control advances to block 708 where the example server 130 provides the positions of available MCUs 104 to the EV 102. In some examples, the positions of available MCUs 104 may include the expected position of MCUs 104 with an indication of the time when they are expected to become available. In some examples, the positions may be presented to a user of the EV 102 via a map to graphically represent the positions of the MCUs 104 relative to a location of the EV 102. In some examples, the server 130 may provide additional information to the EV 102 such as, for example, the time of availability of the MCUs 104 and/or the costs of a battery charge from each of the MCUs.

At block 710, the example server 130 receives a user selection of one of the available MCUs 104. At block 712, the example server 130 identifies a rendezvous location associated with the selected MCU 104. Inasmuch as the users of EVs 102 are likely to know where they are going, the users may select the particular MCU 104 based on a position of the selected MCU 104 such that there is no need for the example server 130 (or the EV mobile charge system 110) to analyze or be aware of the particular travel path of the EV 102 to identify a rendezvous location that is relatively convenient to the EV 102. At block 714, the example server 130 transmits the identified rendezvous location to the EV 102 and the selected MCU 104. Thereafter, the example method of FIG. 7 ends.

Figure 8:
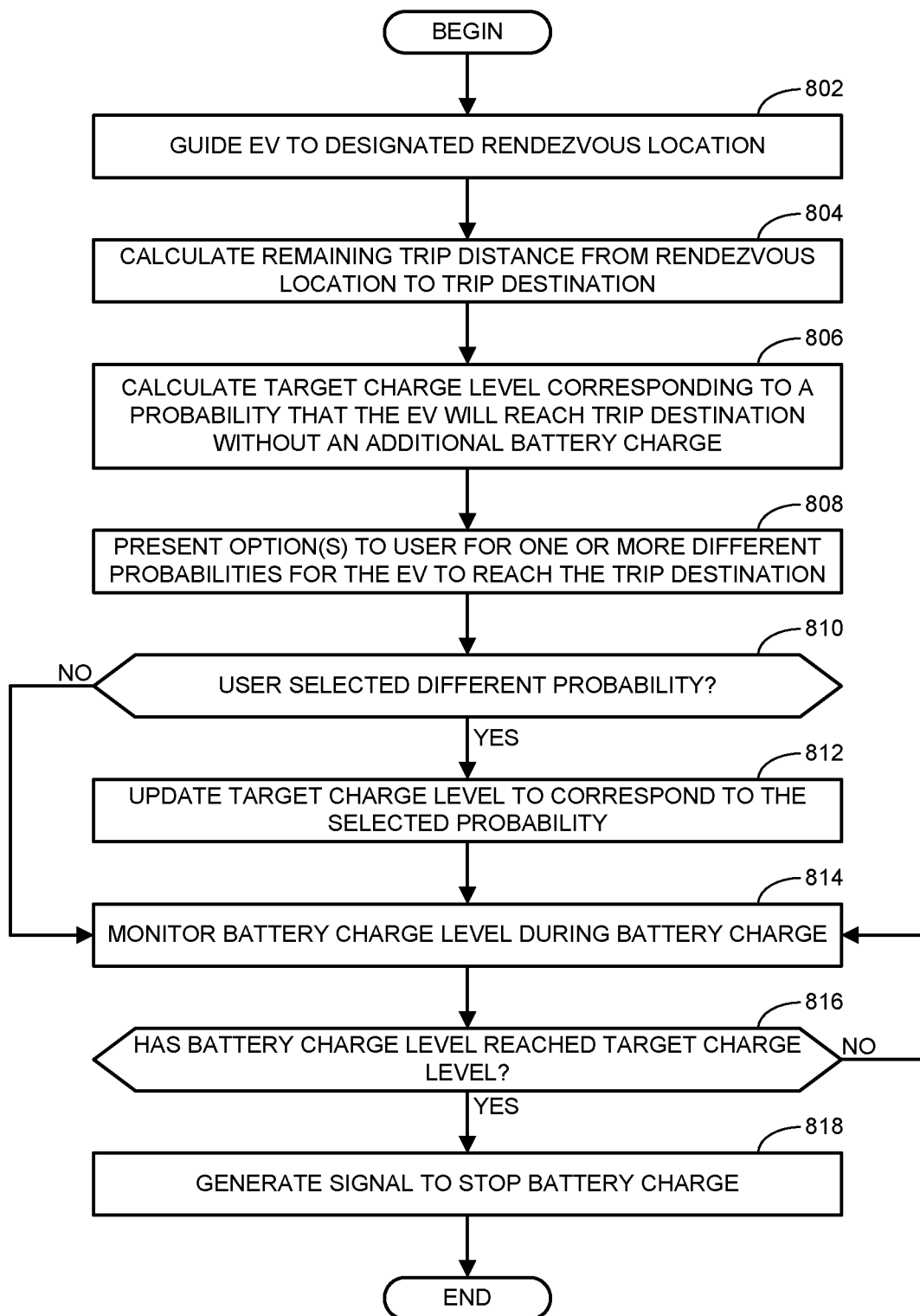
FIG. 8 is a flowchart illustrating an example method to implement the example EV mobile charge system of FIG. 1 to enable the EV to receive a battery charge from the MCU at a rendezvous location.

FIG. 8 is a flowchart illustrating an example method to implement the example EV mobile charge system 110 of FIG. 1 to enable the EV 102 to receive a battery charge from the MCU 104 at a rendezvous location. The example method begins at block 802 where the example navigation system 118 guides the EV 102 to a designated rendezvous location. In some examples, the EV 102 may enter an autonomous mode to be autonomously guided to the rendezvous location. In other examples, the navigation system 118 may provide voice cues and/or directions via a map displayed via the user interface 126.

At block 804, the example charge monitoring system 114 calculates a remaining trip distance from the rendezvous location to a trip destination. In some examples, the remaining trip distance is calculated similarly to block 404 explained above in connection with FIG. 4 and detailed in FIG. 5. At block 806, the example charge monitoring system 114 calculates a target charge level corresponding to a probability that the EV 102 will reach the trip destination without an additional battery charge. In some examples, the probability corresponds to the remaining expected range of the electric vehicle (associated with the target charge level) exceeding the remaining trip distance by a threshold. The threshold may be zero or greater than zero.

At block 808, the example user interface 126 presents an option(s) to a user for one or more different probabilities for the EV 102 to reach the trip destination. For example, the options may enable a user to request a lower probability to reduce the costs incurred from the battery charge and/or to reduce the duration of time the user must wait at the rendezvous location while the EV 102 is being charged. In other examples, the options may enable a user to request a higher probability to reduce the risk of the battery charge being insufficient to power the EV 102 to the final trip destination. At block 810, the example charge monitoring system 114 determines whether a user has selected a different probability. If so, control advances to block 812 where the example charge monitoring system 114 updates the target charge level to correspond to the selected probability. Thereafter, control advances to block 814. If the example charge monitoring system 114 determines that a user has not selected a different probability (block 810), control advances directly to block 814.

At block 814, the example battery charge level monitor 112 monitors the battery charge level during a battery charge (i.e., when the MCU 104 is electrically coupled to the EV 102 to deliver electric energy to the battery assembly 106). At block 816, the example charge monitoring system 114 determines whether the battery charge level has reached the target charge level. If not, control returns to block 814 where the battery assembly 106 continues to be charged. If the example charge monitoring system 114 determines that the battery charge level has reached the target charge level, control advances to block 818 where the example charge monitoring system 114 generates a signal to stop the battery charge. Thereafter the example method of FIG. 8 ends.

Figure 9:
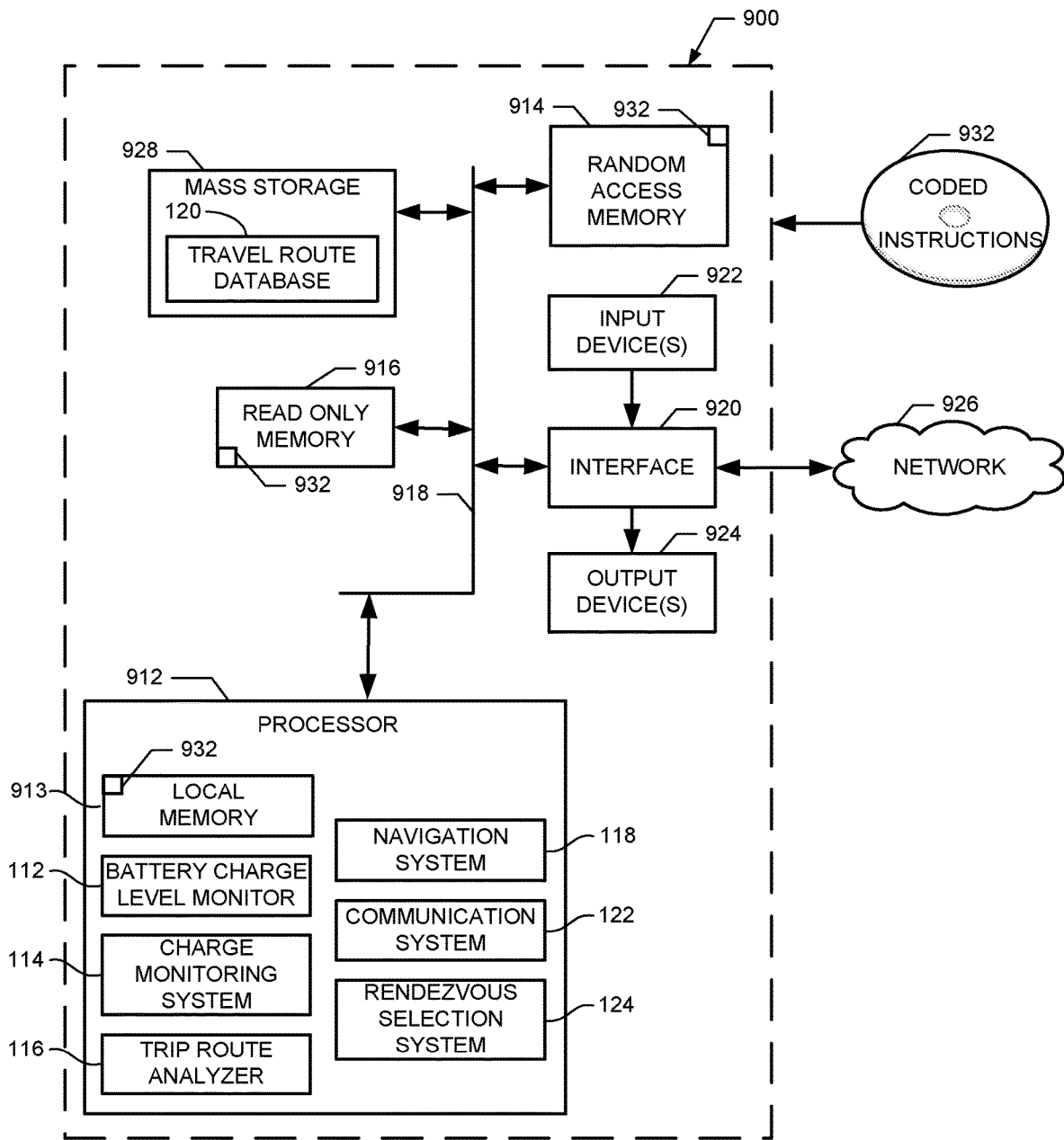
FIG. 9 is a block diagram of an example processor system structured to execute example machine readable instructions represented at least in part by FIGS. 4-8 to implement the example system of FIG. 1.

FIG. 9 is a block diagram of an example processor platform 900 capable of executing instructions to implement the methods of FIGS. 4-8 and the EV mobile charge system 110 of FIG. 1. The processor platform 900 can be, for example, a server, a personal computer, a mobile device (e.g., a cell phone, a smart phone, a tablet such as an iPad™), or any other type of computing device.

The processor platform 900 of the illustrated example includes a processor 912. The processor 912 of the illustrated example includes hardware that may implement one or more of the example battery charge level monitor 112, the example charge monitoring system 114, the example trip route analyzer 116, the example navigation system 118, the example communication system 122, and/or the example rendezvous selection system 124 of the EV mobile charge system 110 of FIG. 1. For example, the processor 912 can be implemented by one or more integrated circuits, logic circuits, microprocessors or controllers from any desired family or manufacturer.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. In some examples, the mass storage devices 928 implement the example travel route database 120 of the EV mobile charge system 110 of FIG. 1. Examples of such mass storage devices 928 include floppy disk drives, hard drive disks, compact disk drives, Blu-ray disk drives, RAID systems, and digital versatile disk (DVD) drives.

Coded instructions 932 to implement the methods of FIGS. 4-8 may be stored in the mass storage device 928, in the volatile memory 914, in the non-volatile memory 916, and/or on a removable tangible computer readable storage medium such as a CD or DVD.

From the foregoing, it will be appreciated that the above disclosed methods, apparatus and articles of manufacture enable the manufacturing of electric vehicles at substantially reduced costs because the vehicles can operate with much smaller (or fewer) batteries and/or battery assemblies. Not only is the cost of the batteries in such vehicles reduced, the reduction in weight of the vehicle resulting from fewer and/or smaller battery assemblies enables smaller and/or lighter vehicles that can be manufactured at less cost and with better fuel economy. In the past, electric vehicles with smaller and/or fewer batteries have been undesirable to the average consumer because such vehicles have a relatively limited driving range. However, the teachings disclosed herein overcome this obstacle by monitoring the remaining expected range of an electric vehicle relative to a remaining trip distance to determine if a battery charge will be needed before arriving at a final trip destination (e.g., where the batteries of the electric vehicle may be recharged). If so, the electric vehicle may request to rendezvous with a mobile charging unit to provide a battery charge to the electric vehicle. Furthermore, the teachings disclosed herein enable the arrangement of multiple battery charges along the travel route of the electric vehicle for relatively long trips that exceed the maximum driving range of the electric vehicle (e.g., an expected range when the battery assembly is fully charged).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:
1. A method comprising:
  monitoring, via a processor, a battery charge level of an electric vehicle receiving a battery charge from a mobile charging unit;
  determining, via the processor, a remaining trip distance of the electric vehicle from a location of the battery charge to a trip destination;

determining, via the processor, a first target charge level for the battery charge, the first target charge level corresponding to when the battery charge level provides a first probability that the electric vehicle will reach the trip destination without an additional battery charge, wherein the first probability is associated with a first cost;

determining, via the processor, a second target charge level for the battery charge, the second target charge level corresponding to when the battery charge level provides a second probability that the electric vehicle will reach the trip destination, wherein the second probability is associated with a second cost that is different than the first cost;

presenting the first probability and the second probability to a user;

receiving a first user selection of the first probability; and generating, via the processor, a first signal to stop the battery charge when the battery charge level reaches the first target charge level.

2. The method of claim 1, wherein the first probability corresponds to a remaining expected range of the electric vehicle exceeding the remaining trip distance by a threshold.

3. The method of claim 2, wherein the threshold varies based on the remaining trip distance.

4. The method of claim 1, further including:
presenting an option to a user of the electric vehicle to increase the battery charge level to the second target charge level greater than the first target charge level, the second target charge level corresponding to the second probability greater than the first probability;
receiving a second user selection of the option; and
generating, via the processor, a second signal to stop the battery charge when the battery charge level reaches the second target charge level.

5. The method of claim 4, further including:
determining the second cost corresponding to the option to increase the battery charge level to the second target charge level; and
presenting the second cost with the option.

6. The method of claim 5, wherein the second cost corresponds to a difference between a cost for the battery charge from the mobile charging unit and a cost for a second battery charge from a stationary charging unit at the trip destination.

7. The method of claim 5, further including:
determining a time delay corresponding to the option to increase the battery charge level to the second target charge level, the time delay determined based on a charge rate provided by the mobile charging unit; and
presenting the time delay with the option.

8. An apparatus comprising:
a battery charge level monitor to monitor a battery charge level of an electric vehicle receiving a battery charge from a mobile charging unit;
a trip route analyzer to determine a remaining trip distance of the electric vehicle from a location of the battery charge to a trip destination;
a charge monitoring system to determine a first target charge level for the battery charge, the first target charge level corresponding to when the battery charge level provides a first probability that the electric vehicle will reach the trip destination without an additional battery charge, wherein the first probability is associated with a first cost,
the charge monitoring system to determine a second target charge level for the battery charge, the second target charge level corresponding to when the battery charge level provides a second probability that the electric vehicle will reach the trip destination, wherein the second probability is associated with a second cost that is different than the first cost;
the charge monitoring system to present the first probability and the second probability to a user;
the charge monitoring system to receive a first user selection of the first probability; and
the charge monitoring system to generate a first signal to stop the battery charge when the battery charge level reaches the first target charge level, at least one of the battery charge level monitor, the trip route analyzer, or the charge monitoring system to be implemented via a processor.

9. The apparatus of claim 8, wherein the first probability corresponds to a remaining expected range of the electric vehicle exceeding the remaining trip distance by a threshold.

10. The apparatus of claim 9, wherein the threshold varies based on the remaining trip distance.

11. The apparatus of claim 8, further including a user interface to present an option to a user of the electric vehicle to increase the battery charge level to the second target charge level greater than the first target charge level, the second target charge level corresponding to the second probability greater than the first probability, the charge monitoring system to receive a second user selection of the option, the charge monitoring system to generate a second signal to stop the battery charge when the battery charge level reaches the second target charge level.

12. The apparatus of claim 11, wherein the charge monitoring system is to determine the second cost corresponding to the option to increase the battery charge level to the second target charge level, the user interface to present the second cost with the option.

13. The apparatus of claim 12, wherein the second cost corresponds to a difference between a cost for the battery charge from the mobile charging unit and a cost for a second battery charge from a stationary charging unit at the trip destination.

14. The apparatus of claim 12, wherein the charge monitoring system is to determine a time delay corresponding to the option to increase the battery charge level to the second target charge level, the time delay determined based on a charge rate provided by the mobile charging unit, the user interface to present the time delay with the option.

15. A tangible computer readable storage medium comprising instructions that, when executed, cause a machine to at least:
monitor a battery charge level of an electric vehicle receiving a battery charge from a mobile charging unit;
determine a remaining trip distance of the electric vehicle from a location of the battery charge to a trip destination;
determine a first target charge level for the battery charge, the first target charge level corresponding to when the battery charge level provides a first probability that the electric vehicle will reach the trip destination without an additional battery charge, wherein the first probability is associated with a first cost;
determine a second target charge level for the battery charge, the second target charge level corresponding to when the battery charge level provides a second probability that the electric vehicle will reach the trip destination, wherein the second probability is associated with a second cost that is different than the first cost;

present the first probability and the second probability to a user;

receive a first user selection of the first probability; and generate a first signal to stop the battery charge when the battery charge level reaches the first target charge level.

16. The storage medium of claim 15, wherein the first probability corresponds to a remaining expected range of the electric vehicle exceeding the remaining trip distance by a threshold.

17. The storage medium of claim 16, wherein the threshold varies based on the remaining trip distance.

18. The storage medium of claim 15, wherein the instructions further cause the machine to:

present an option to a user of the electric vehicle to increase the battery charge level to the second target charge level greater than the first target charge level, the second target charge level corresponding to the second probability greater than the first probability;

receive a second user selection of the option; and generate a second signal to stop the battery charge when the battery charge level reaches the second target charge level.

19. The storage medium of claim 18, wherein the instructions further cause the machine to:

determine the second cost corresponding to the option to increase the battery charge level to the second target charge level; and present the second cost with the option.

20. The storage medium of claim 18, wherein the instructions further cause the machine to:

determine a time delay corresponding to the option to increase the battery charge level to the second target charge level, the time delay determined based on a charge rate provided by the mobile charging unit; and present the time delay with the option.

* * * * *